United States Patent
Sung

[11] Patent Number: 5,934,772
[45] Date of Patent: Aug. 10, 1999

[54] REAR ASSEMBLY FOR A DISPLAY DEVICE

[75] Inventor: Ki-Hyub Sung, Suwon-si, Rep. of Korea

[73] Assignee: Samsung Electronics Co., Ltd., Suwon, Rep. of Korea

[21] Appl. No.: 08/925,191

[22] Filed: Sep. 8, 1997

[30] Foreign Application Priority Data

| Sep. 6, 1996 | [KR] | Rep. of Korea | 96-28488 |
| Sep. 6, 1996 | [KR] | Rep. of Korea | 96-28489 |
| Sep. 6, 1996 | [KR] | Rep. of Korea | 96-38768 |

[51] Int. Cl.⁶ ................................................. A47B 81/00
[52] U.S. Cl. ..................... 312/7.2; 348/843; 348/836; 312/265.6; 312/223.2; 312/263
[58] Field of Search ................................ 312/7.2, 223.1, 312/223.3, 265.6, 257.1, 263, 223.2; 348/825, 826, 831, 836, 839, 843, 844

[56] References Cited

U.S. PATENT DOCUMENTS

| 4,635,809 | 1/1987 | Bachman et al. | 312/7.2 X |
| 5,360,263 | 11/1994 | Nakano et al. | 312/263 X |
| 5,363,150 | 11/1994 | Kojima | 348/843 X |
| 5,423,605 | 6/1995 | Liu | 312/265.6 |
| 5,593,219 | 1/1997 | Ho | 312/223.1 X |
| 5,593,220 | 1/1997 | Seid et al. | 312/223.2 X |
| 5,730,512 | 3/1998 | Heirich | 312/7.2 |
| 5,742,360 | 4/1998 | Kwon et al. | 312/7.2 X |

Primary Examiner—Peter M. Cuomo
Assistant Examiner—Stephen Vu
Attorney, Agent, or Firm—Robert E. Bushnell, Esq.

[57] ABSTRACT

A display device including a front cover connected to a cathode ray tube, a rear body of cover joined to the front cover for covering the cathode ray tube and a top cover connected to a rear upper portion of the rear body of cover. The rear body of cover is joined to the top cover by means of front locking mechanism having hook each formed at both sides of the forepart of the top cover and inserted and the snap into holes formed at both sides of the rear body of cover to be caught in catches. Side locking mechanisms have a pair of tensioned snaps that are formed at both sides of the rear body of cover and pass through a pair of ribs that are provided on the inner sides of the top cover, thus enabling the tensioned snaps to be securely mated with the ribs. Rear locking mechanisms have hooks that are caught on, and snap against rises of locking ribs formed inside of the top cover. Another coupling mechanism with a plurality of right position coupling holes, is formed at an edge of the rear body of cover, and projections, formed art the other edge of the top cover are each inserted into the right position coupling holes.

20 Claims, 12 Drawing Sheets

REAR ASSEMBLY FOR A DISPLAY DEVICE

CLAIM FOR PRIORITY

This application makes reference to, claims all rights of priority under, and incorporates herein all of my patent applications entitled Display Device Having Rear Cover Body And Top Cover earlier filed in the Korean Industrial Property Office simultaneously on the day of Sep. $6^{th}$ 1996, and there duly assigned Ser. Nos. 1996/28488, 1996/28489 and 1996/38768.

BACKGROUND OF THE INVENTION

1. Field of the Invention

The present invention relates to display devices having rear covers, and, more particularly, to display devices with rear covers formed from two pans that are individually manufactured and then joined to each other to form a single rear cover, and also to the structures of couplings for rear covers of bodies and top covers for forming a rear cover that can not be made by molding or injection molding.

2. Discussion of Related Art

Generally, a monitor is manufactured with a front cover, a cathode ray tube coupled to the front cover, one or more printed circuit boards installed under the cathode ray tube, and a rear cover joined to the front cover. The rear cover is designed principally to provide protection for the internal components by sealing the rear part of the display device, and is typically designed to be narrower toward its rear end. In case of using the conventional rear cover for a display device, the rear cover itself becomes similar to the front cover in size, thus deteriorating the design of a display device. Contemporary restrictions on the design of the display apparatus principally attributable to manufacturing considerations and continuing need to make the rear cover as a single piece while increasing production yield and lowering manufacturing costs. I have noticed that the outward appearance of the display device is important, and if the size of the front cover is substantially the same as the rear cover, the outer appearance of the display device is unattractive, thus detracting from the aesthetic attractiveness of the resulting product. I have also found that demands caused by increases in the size of the video circuit board and shield case, as well as the addition of extra components and various functions for the display device, have created a need for a new design for a display device that is not restricted by manufacturing conditions.

SUMMARY OF THE INVENTION

Accordingly, it is an object of the present invention to provide an improved display device.

It is an object to provide a display device having a rear cover able to accommodate increased size and the number of components encased by the housing of the display device.

It is still another object to provide a display device having an aesthetically pleasing rear cover able to enhance the external reliability of the display device, and a structure easily coupling the rear cover body and the top cover together.

It is yet another object to provide a rear cover for a visual display apparatus the is aesthetically pleasing in shape, contour and appearance.

It is still yet object of provide a rear cover for a visual display apparatus, equipped with a coupling mechanism enabling secure, quick and easy joinder between the housing for the display apparatus and the rear cover. It is a further object still to provide a rear cover for a display device that positions connectors for a top cover in positions that increase the reliability of the display device.

To achieve these and other advantages, a display device is provided that has a front cover connected to a cathode ray tube, a rear cover body joined to the front cover for covering the cathode ray tube; and a top cover connected to a rear upper portion of the rear cover. The rear cover is joined to the top cover by latches that are positioned on the front of the top cover and are and inserted into corresponding slots formed on opposite lateral sides of the rear cover spring coupling mechanisms are formed on opposite lateral sides of the rear cover. A top cover has a pair of ribs provided on the inner sides of the top cover, that engage with flexible members. The ribs and flexible members combine to form the spring coupling mechanisms. Spring coupling mechanisms are also used along the rear side of the rear cover to engage the locking ribs formed inside of the top cover. The rear cover includes a plurality of holes for ejecting heat created within the interior of the display device to the surrounding atmoshere. The configuration of connectors for attaching the top cover to the rear cover produces superior reliability in the display device and a more secure connection between the top cover and the rear cover.

BRIEF DESCRIPTION OF THE ATTACHED DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
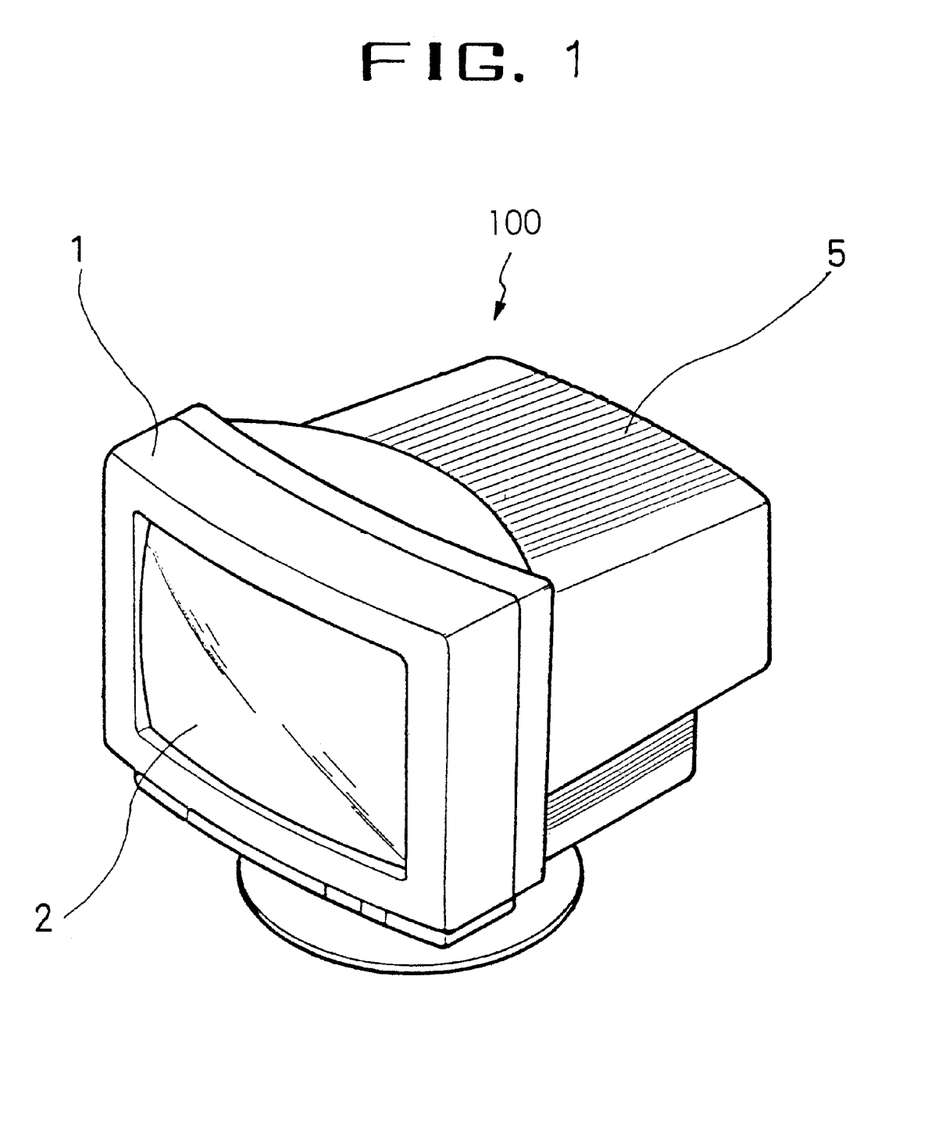
FIG. 1 is a perspective view of a display device.
Figure 2:
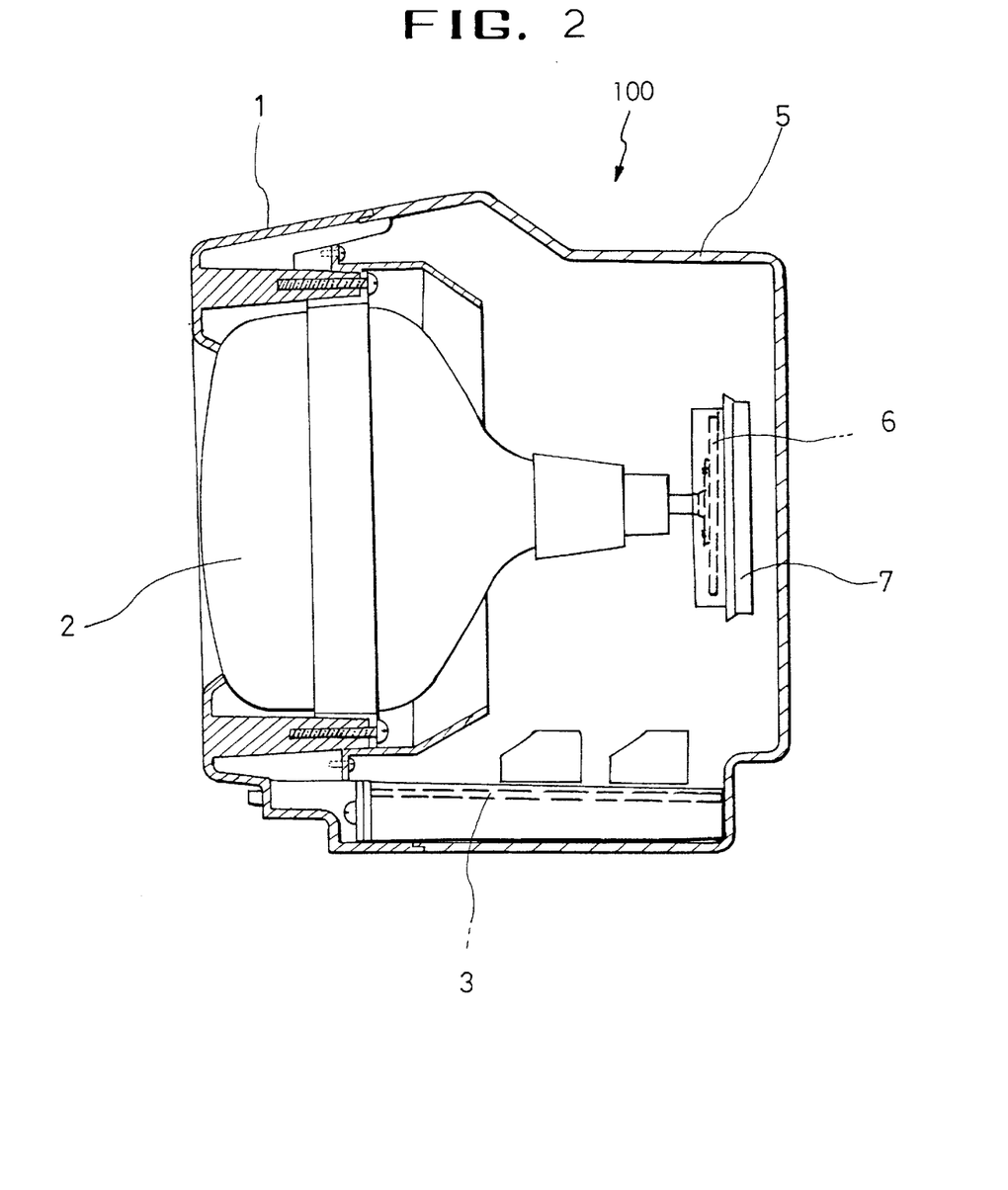
FIG. 2 is a side-sectional view of the display device of FIG. 1.

A display device 100 provides a variable visual display of images in response to video signals applied to the device, includes, as is illustrated by FIGS. 1 and 2, a front cover 1, a cathode ray tube 2 coupled to the front cover 1, a main printed circuit board 3 installed under cathode ray tube 2, and a rear cover 5 joined to front cover 1. Rear cover 5 for such a display device provides protection for the internal components by sealing the rear part of the display device and becomes narrower toward its rearmost part opposite from the front cover because a video circuit board 6 and a shield case 7 for shielding video circuit board 6 are provided for the cathode ray tube's neck and the rear cover is manufactured as a single piece. The size of the rear cover 5 has been increased in contemporary practice in order to accommodate demand for increases in the size of video circuit board 6 and shield case 7, and the addition of extra components and various functions for the display device.

Figure 3:
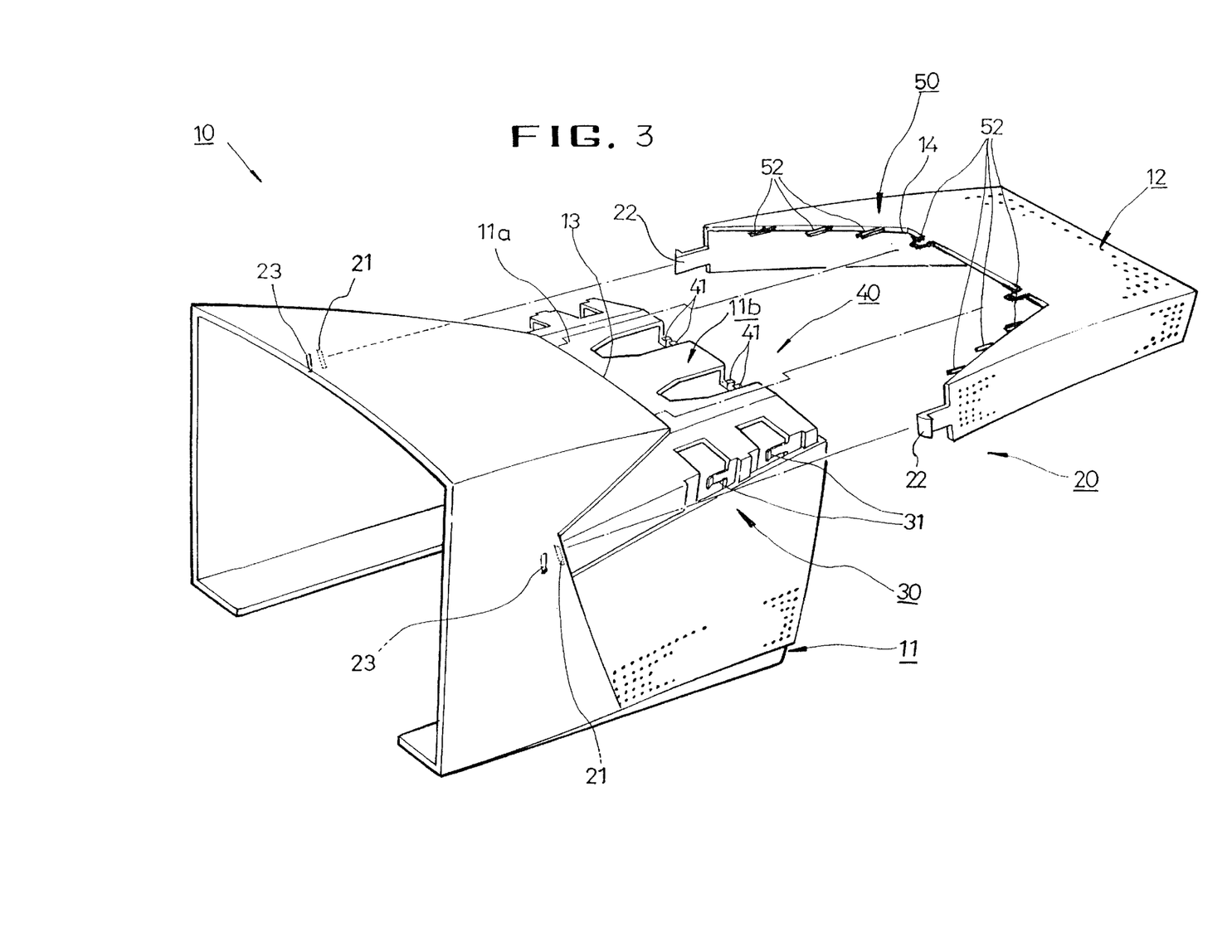
FIG. 3 is an exploded-perspective view of a rear cover for a display device constructed in accordance with the principles of the present invention.

FIG. 3 depicts a rear assembly 10 for a display device in accordance with the present invention. Rear assembly 10 has a rear cover 11 and a top cover 12 that is coupled with rear cover 11. Rear cover 11 protrudes slightly upward, and at a rear upper portion 11b there are formed a plurality of holes 61 that are shielded by top cover 12 and emit heat produced by the monitor. Holes that are smaller than those holes in the rear cover upper portion 11b the discharge heat through the top cover.

Top cover 12 has latches 20 disposed along a front side for connecting top cover 12. Rear cover 11 also includes side dislocating configuration 30, and a rear locking mechanism 40. Front disposed latches 22 are formed to protrude toward the forepart of top cover 12 and to be inserted throught slots 21 formed on both sides of the body of rear cover 11; the distal ends of latches 22 are caught in notches 23 each spaced slightly apart from slots 21, that are formed in the lateral sides of rear cover 11.

Figure 4:
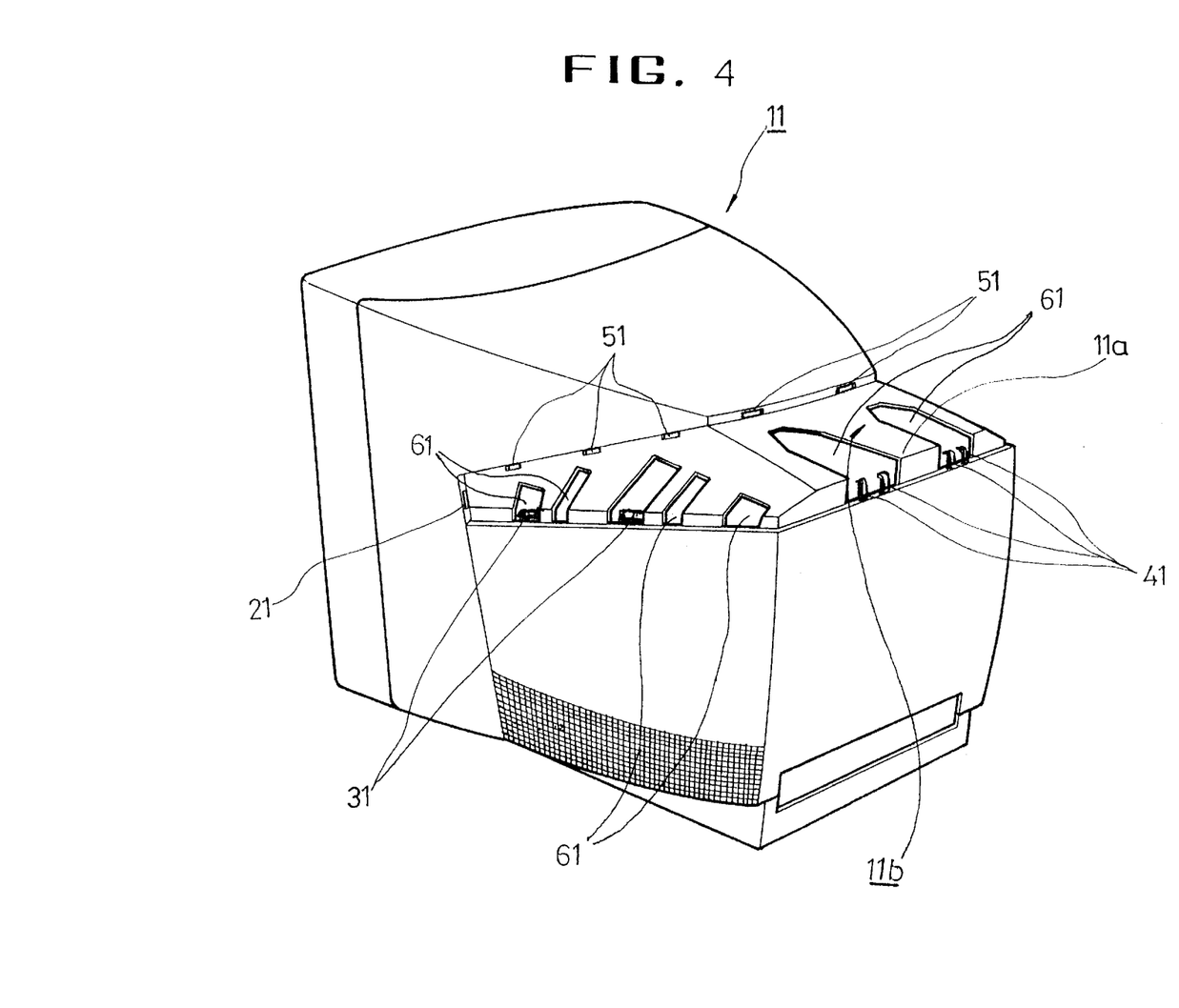
FIG. 4 is a perspective view of a display device constructed in accordance with the principles of the present invention.

FIG. 4 shows a perspective view of the orientation of the different connectors used by the rear assembly. It is the orientation of the connectors that makes the engagement between the rear cover and the top cover more secure and stable.

Figure 5:
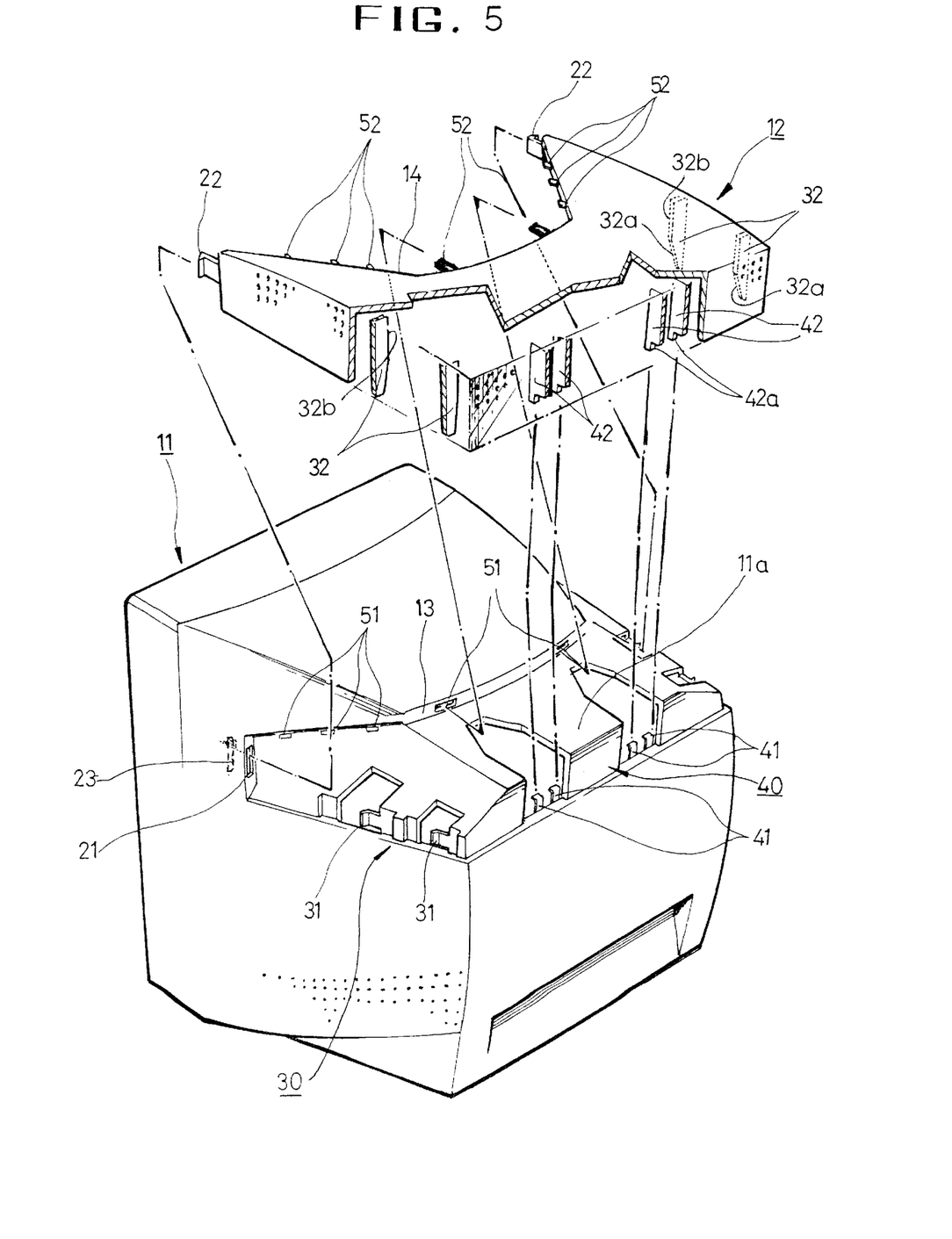
FIG. 5 is a cutaway-perspective view of the display device showing a spring coupling mechanism for the rear cover constructed in accordance with the principles of the present invention.

Referring now to FIG. 5, each of side spring coupling 30 has a pair of flexible members 31 that are formed on both sides of rear cover 11, and engage edges 32b of pair of ribs 32 which are formed on both sides of the interior of top cover 12. The ribs initially slide against the flexible members until the flexible members securely mate with ribs 32. Rear spring coupling 40 has flexible prongs 41 that are caught on and hook against grooves 42a of ridges 42 formed inside of top cover 12. The coupling mechanism includes a plurality of right position coupling holes 51 formed at an edge 13, and projections 52 that are formed at an edge 14 and each inserted into the right, position coupling holes 51, so that the body of cover 11 is properly, securely and tightly connected to top cover 12 at a plurality of locations along the adjoining mated edges 13, 14.

Referring now to FIGS. 5 to 9, the coupling of rear cover 11 and top cover 12 will now be described in detail. Top cover 12 of the disclosed embodiment of the present invention is pushed from the upper rear part 11a of rear cover 11 to the front, thus matingly coupling with the rear cover 11. First, latches 22 are positioned to be received into and hook holes 21, simultaneously with protrusion 52 being fit into coupling holes 51 of coupling mechanism 50. Top cover 12 is then pushed against the rear cover 11 so as to be coupled with rear cover 11. Front spring coupling mechanism 20, side spring coupling mechanism 30, rear spring coupling mechanism 40, and coupling mechanism 50 engage and lock at the same time. These locking mechanisms will be now fully described in the following paragraphs.

Figure 6:
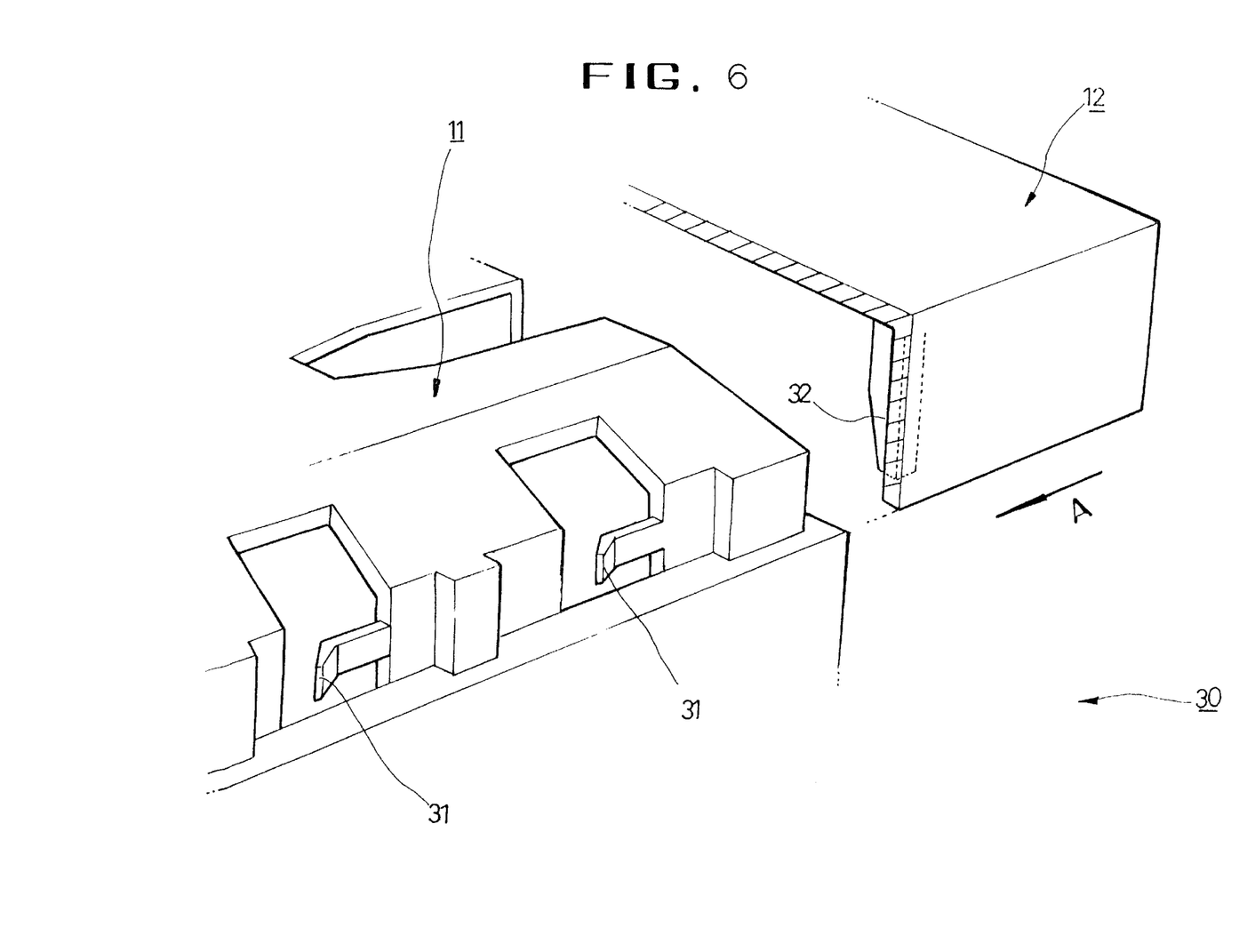
FIG. 6 is an exploded-perspective view of a main part showing a side spring coupling mechanism constructed in accordance with the principles of the present invention.
Figure 7A:
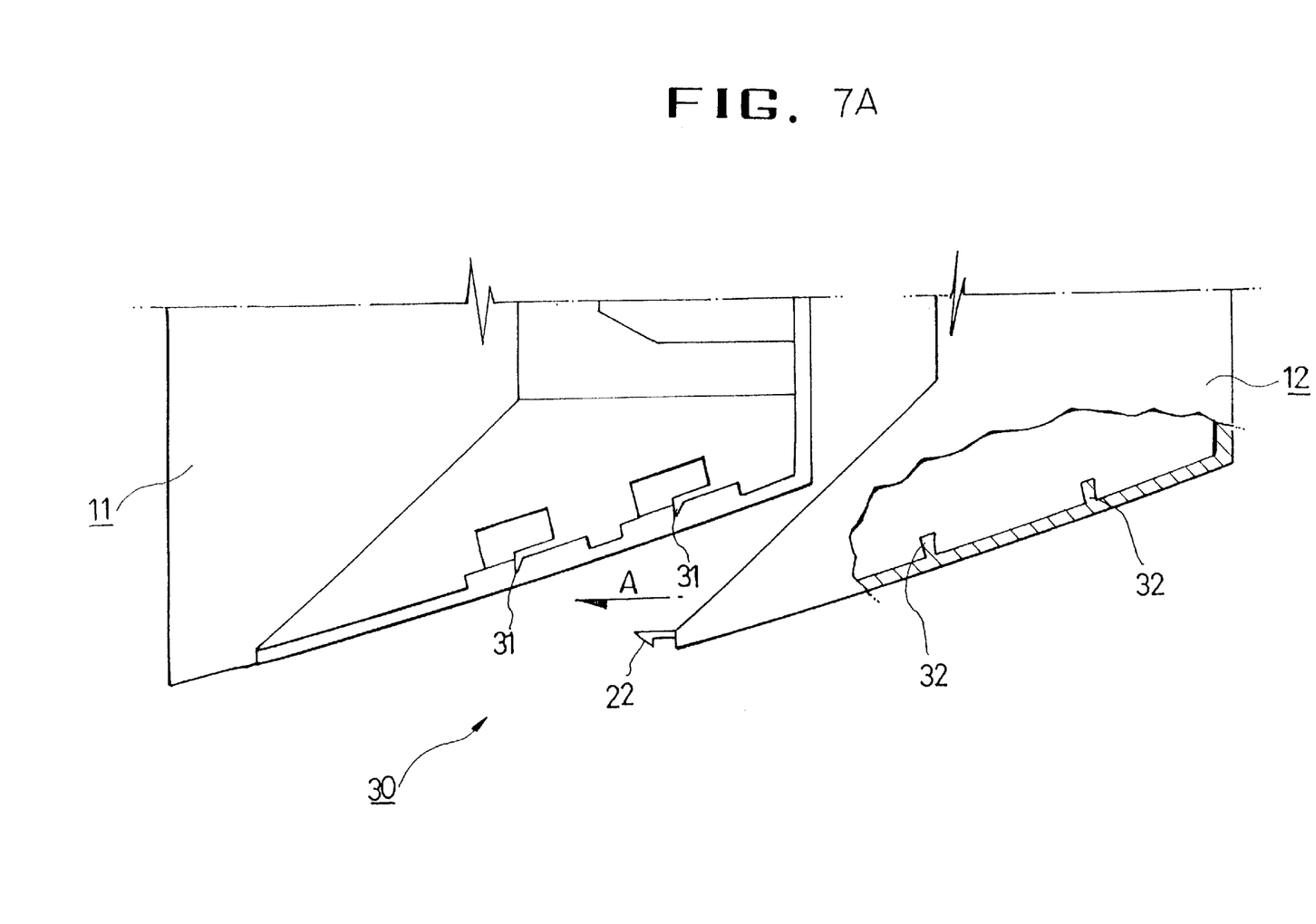
FIGS. 7A and 7B depict views of joint and disjoint connections of the side spring coupling mechanism between the different components.
Figure 7B:
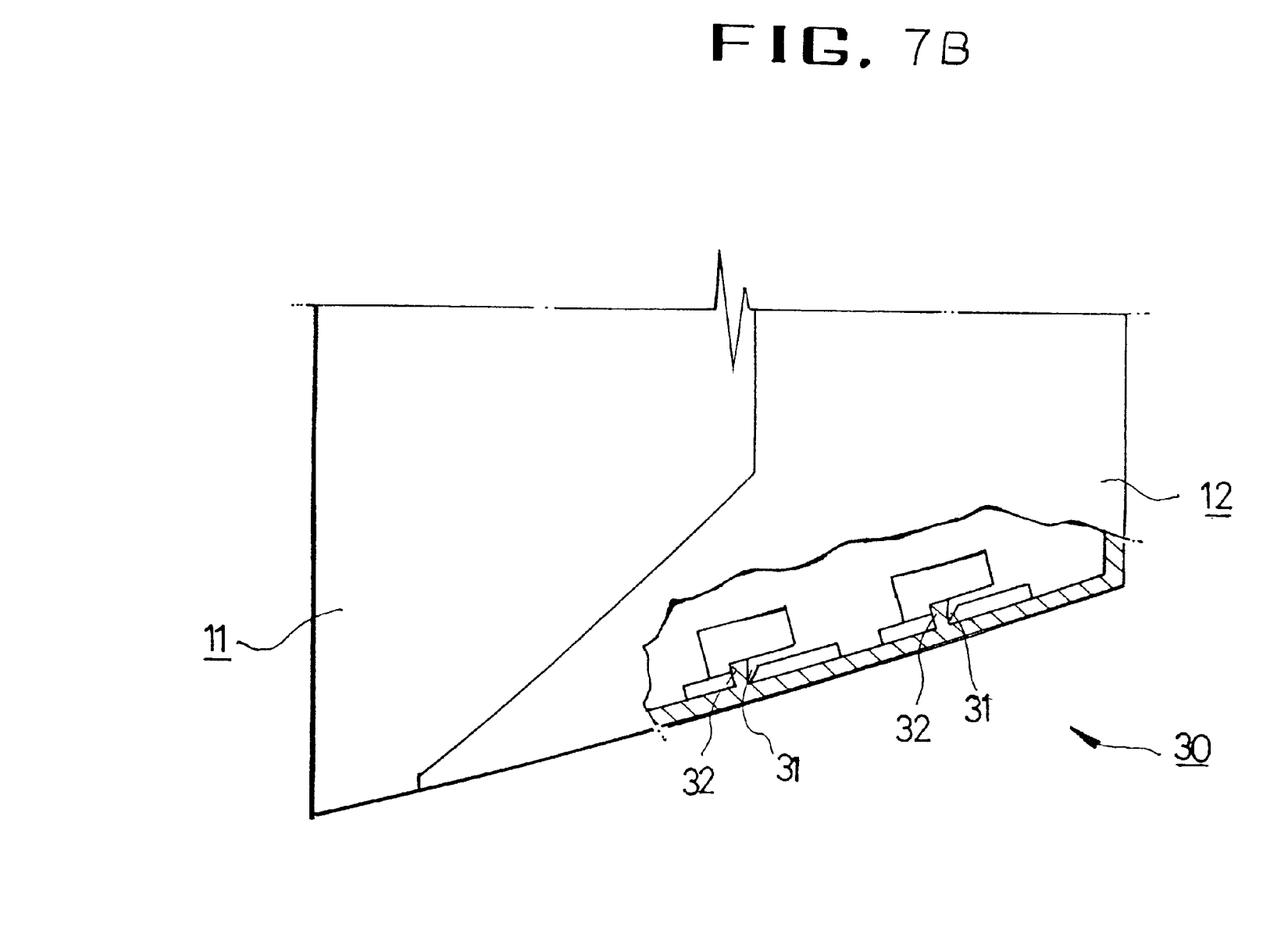

As shown in FIGS. 3 and 5, latches 22 of spring coupling mechanism 20 are inserted (i.e., snapped) into slots 21 and caught by notches 23 in a manner so that both sides of the front end of top cover 12 are locked together with rear cover 11. Side spring coupling mechanism 30 are depicted in FIGS. 6, 7A and 7B, and ribs 32 of the top cover 12 push flexible members 31 of rear cover 11 with a force so that top cover 12 is pressed in the A direction, as shown in FIGS. 6 and 7A, so as to be coupled with rear cover 11. Flexible members 31 are curved inwardly by the pushing force of ribs 32, so that ribs 32 pass over flexible members 31. Once ribs 32 pass completely past flexible members 31, flexible members 31 return to their original state under the biased force created by their own elasticity, whereby ribs 32 are caught by tensioned snaps 31, and locked in, so as to be not inadvertently dislocated.

Figure 8A:
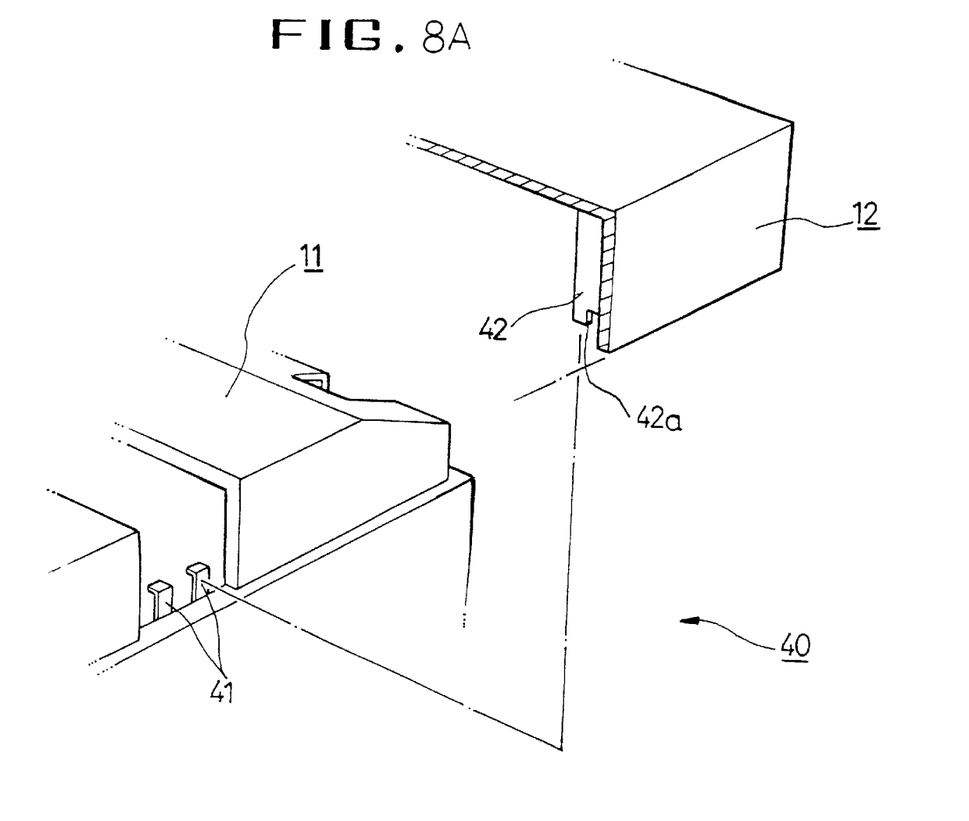
FIGS. 8A and 8B are an exploded-perspective view and a side view of a rear spring coupling means.
Figure 8B:
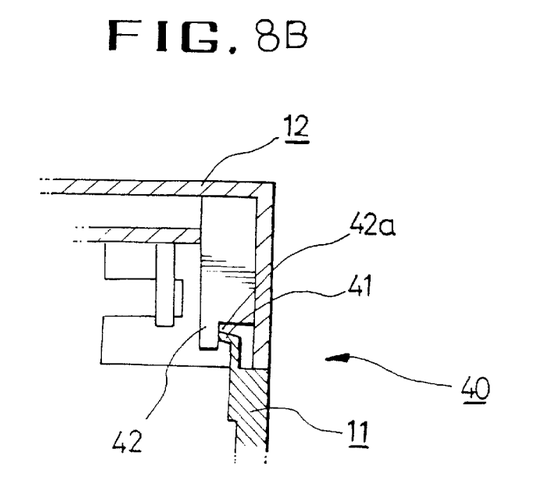

FIGS. 8A and 8B depict rear locking mechanism 40. Locking ridges 42 of rear locking mechanism 40 pass over flexible prongs 41, thereby pushing prongs 41, and as locking mechanism 40 passes completely past flexible prongs 41, displaced flexible prongs 41 return to their original state, whereby flexible prongs 41 are caught in grooves 42a of locking ridges 42.

Coupling mechanism 50 illustrated by FIG. 3 makes edges 13 and 14 connect to each other, and as projections 52 of top cover 12 are each inserted into right position coupling holes 51 of rear cover 11, edge 14 of top cover 12 comes in close mating contact with edge 13 of the rear cover 11, thus securely joining cover 12 to rear cover 11.

All the coupling mechanisms, latches, and projections provide a complete and simultaneous locking operation, as described above, and once top cover 12 is coupled to rear cover 11 in this manner to form rear assembly top 10, cover 12 will not be inadvertently dislodged therefrom. Therefore, if top cover 12 needs to be uncoupled from rear cover 11 for, by way of example, repairs or maintenance of the image forming apparatus, rear assembly cover 10 may be separated from front cover 1.

Figure 9:
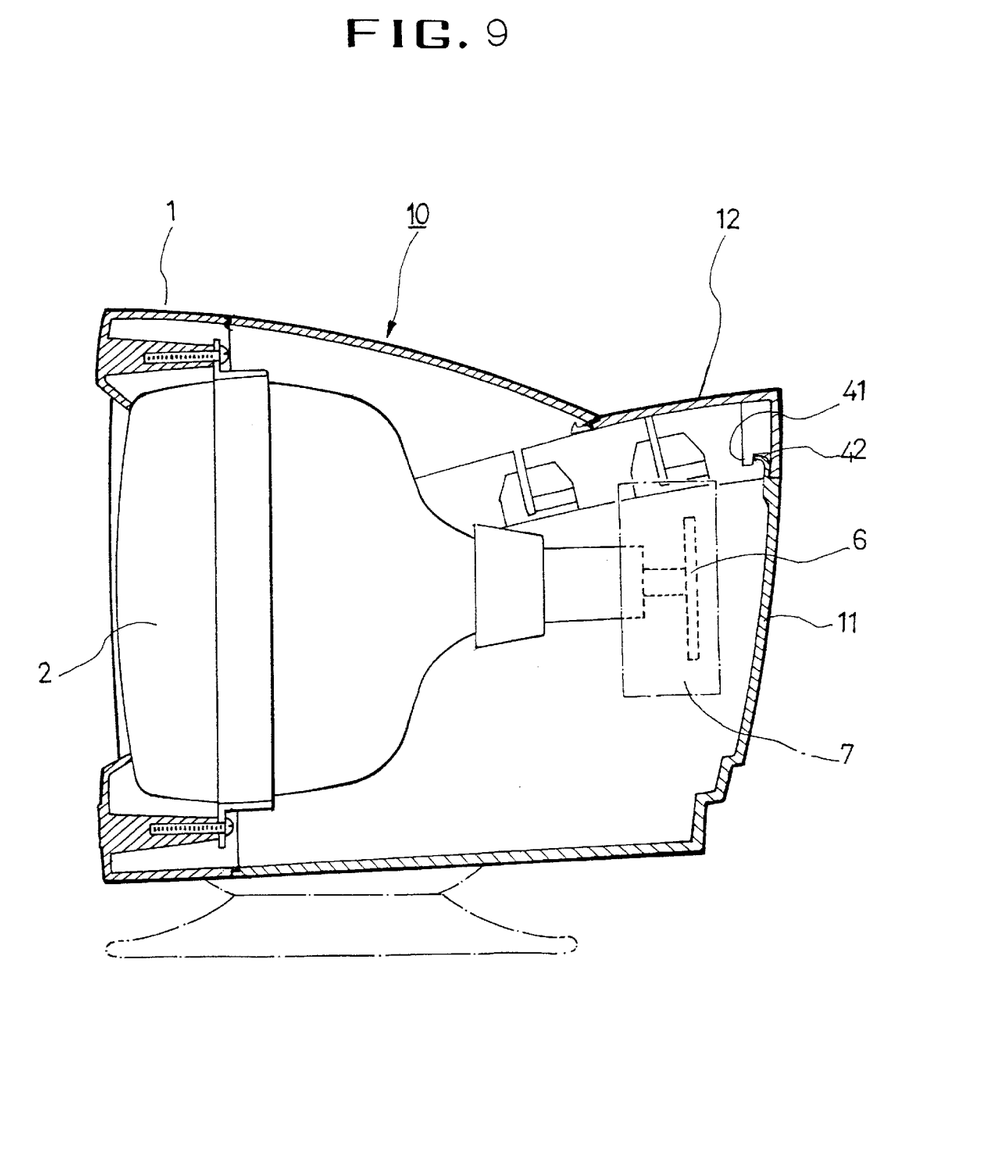
FIG. 9 is in overall sectional view of a display device with a rear cover in accordance with the principles of the present invention.
Figure 10:
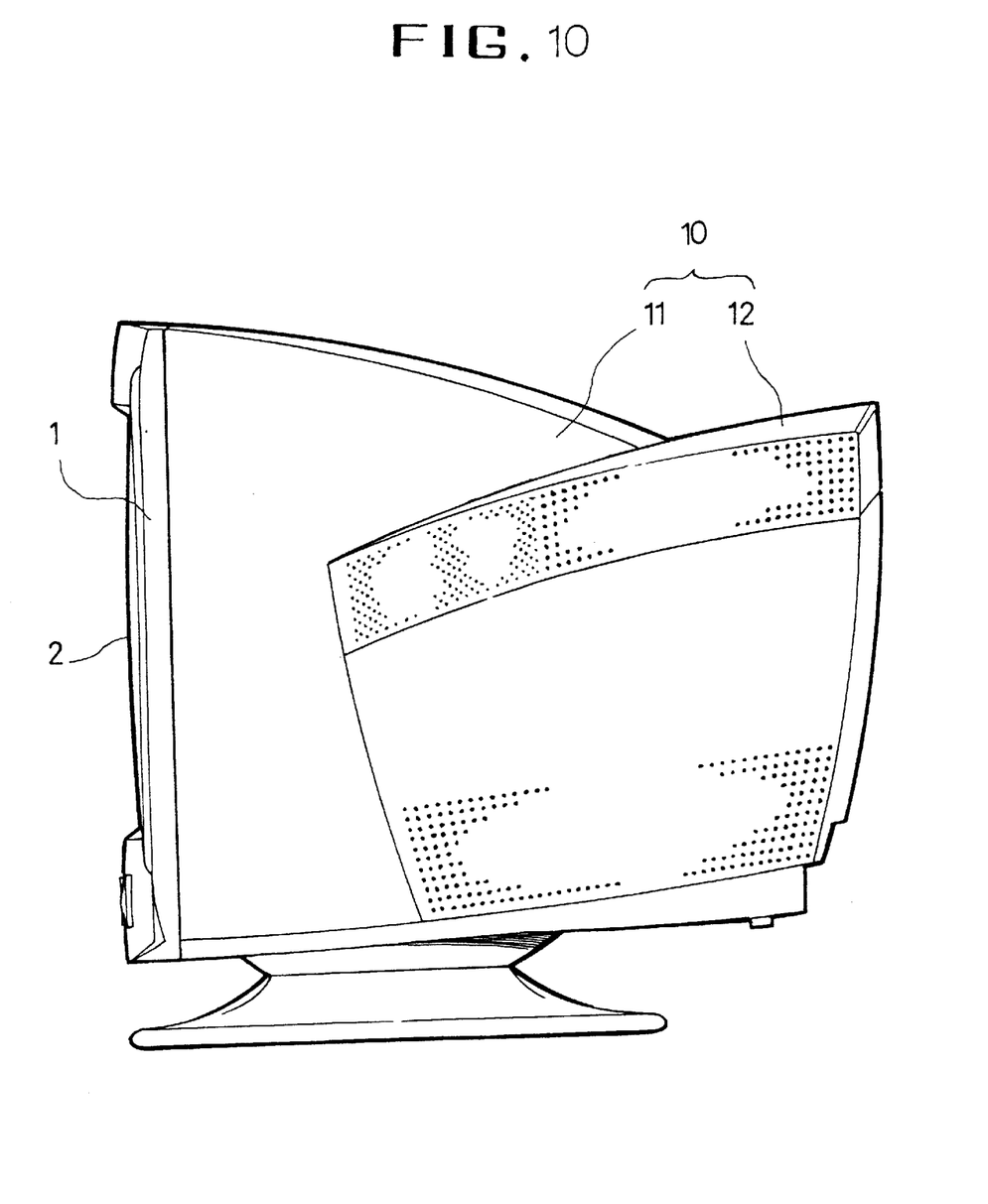
FIG. 10 depicts one side of the display device of FIG. 9.
Figure 11:
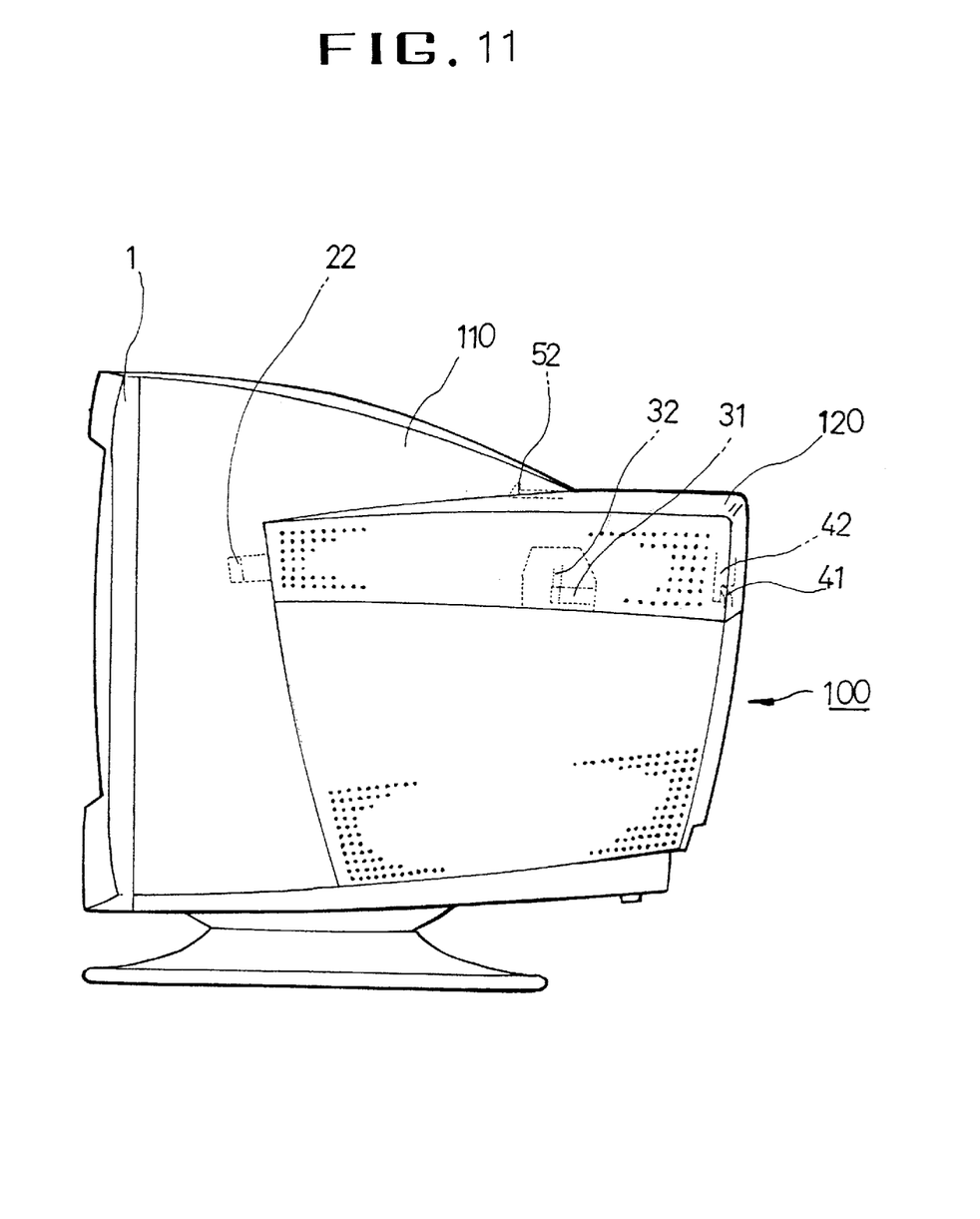
FIG. 11 is a side view of a display device constructed in accordance with the principles of the prevent invention.

FIGS. 9, 10 and 11 illustrate another preferred embodiment of the present invention. Rear cover 10 includes the body of cover 11 and top cover 12, a rear end portion rear cover 11 is not lifted up but horizontal or a bit lowered.

As described above, the embodiment of a rear cover for a display device is designed to he separated into two parts, i.e. the rear cover and a top cover. These two parts can be easily and securely joined to, and disconnected from each other, thus providing various possible designs. In addition, the rear cover and top cover of the inventive rear assembly cover may have different colors, thereby making the outer appearance of the display device aesthetically pleasing.

It will be apparent to those skilled in the art that various modifications and variations can be made in the rear cover for a display device of the present invention without departing from the spirit or scope of the invention. Thus, it is intended that the present invention cover the modifications and variations of this invention provided they come within the scope of the appended claims and their equivalents.

What is claimed is:

1. A display device, comprising:
   a front cover;
   a rear cover attached to the front cover and having a top side, two lateral sides, and a rear side, said rear cover comnprising:
   each of said two lateral sides having a latch receiving means and a plurality of flexible members that protrude outward from said rear cover;

said rear side having a plurality of flexible prongs; and a top cover slidably attachable to said rear cover and engageable with said flexible prongs, said latch receiving means, and said flexible members of said rear cover.

2. The display device according to claim 1, wherein the rear cover is joined to the top cover with said top cover engaging said latch receiving means, said flexible members, and said flexible prongs simultaneously.

3. The display device according to claim 2, wherein said top cover can be removed to expose a plurality of perforations in said rear cover.

4. The display device according to claim 2, wherein said top cover has an inner surface bearing a plurality of ribs engageable with said flexible members on said two lateral sides of said rear cover.

5. The display device according to claim 4, wherein said top cover has a plurality of ridges for engaging said prongs on said rear cover.

6. The display device according to claim 5, wherein the said latch receiving means, said flexible members, and said flexible prongs are located symmetrically about said rear cover.

7. The display device according to claim 6, wherein said top cover has a plurality of projections located along an edge contacting said rear cover.

8. The display device according to claim 7, wherein said rear cover and said top cover are engageable without the use of fasteners.

9. The display device according to claim, wherein the latch receiving means comprises a slot in said rear cover and a notch in an inner surface of said rear cover.

10. A housing for a display device, comprising:

a front cover;

a rear cover attached to said front cover and having a top side, two lateral sides, and a rear side, said rear cover comprising:

each of said two lateral sides having a slot for receiving a latch and having a plurality of flexible members that protrude outward from said rear cover; and said rear side having a plurality of flexible prongs; and
a top cover slidably attachable to said rear cover, when said top cover is attached to said rear cover all of said flexible prongs, said slot in each of said two lateral sides, and said flexible members engage said top cover simultaneously.

11. The housing of claim 10, further comprised of said top cover being removable from said rear cover to expose a plurality of perforations in said rear cover.

12. The housing of claim 11, further comprising said top cover having an inner surface bearing a plurality of ribs engageable with said flexible members on said two lateral sides of said rear cover.

13. The housing of claim 12, with said top cover further comprising a plurality of ridges for engaging said prongs on said rear cover.

14. The housing of claim 13, with said rear cover further comprising said slot in each of said two lateral sides, said flexible members, and said flexible prongs being located symmetrically about said rear cover.

15. The housing of claim 14, with said top cover further comprising a plurality of projections located along an edge contacting said rear cover.

16. A housing for a display device, comprising:

a front cover;

a rear cover attached to said front cover and having a top side, two lateral sides, and a rear side, said rear cover comprising:

each of said two lateral sides having a slot for receiving a latch and having a plurality of flexible members that protrude outward from said rear cover;

said rear side having a plurality of flexible prongs; and said slot in each of said two lateral sides, said flexible members, and said flexible prongs being located symmetrically about said rear cover; and a top cover slidably attachable, without the use of fasteners, to said rear cover, when said top cover is attached to said rear cover all of said flexible prongs, said slot in each of said two lateral sides, and said flexible members engage said top cover simultaneously.

17. The housing of claim 16, further comprised of said top cover being removable from said rear cover to expose a plurality of perforations in said rear cover.

18. The housing of claim 17, further comprising said top cover having an inner surface bearing a plurality of ribs engageable with said flexible members on said two lateral sides of said rear cover.

19. The housing of claim 18, with said top cover further comprising a plurality of ridges for engaging said prongs on said rear cover.

20. The housing of claim 19, with said top cover further comprising a plurality of projections located along an edge contacting said rear cover.

* * * * *